United States Patent [11] 3,628,450

| | | |
|---|---|---|
| [72] | Inventor | Robert W. Schmidt<br>5744 West 77th Hill, Oak Lawn, Ill. 60459 |
| [21] | Appl. No. | 860,961 |
| [22] | Filed | Sept. 25, 1969 |
| [45] | Patented | Dec. 21, 1971 |

[54] DIE ACCELERATOR
6 Claims, 1 Drawing Fig.

[52] U.S. Cl. ...................................... 83/38,
83/76, 83/295, 83/369
[51] Int. Cl. ........................................ B23d 25/16
[50] Field of Search .................................. 83/37, 369,
38, 295, 311, 324, 293, 286, 298, 287, 76

[56] References Cited
UNITED STATES PATENTS

| 3,081,657 | 3/1963 | Harris.......................... | 83/369 X |
|---|---|---|---|
| 3,169,429 | 2/1965 | Bognar......................... | 83/293 X |
| 3,251,255 | 5/1966 | Bauman ....................... | 83/369 X |
| 3,490,322 | 1/1970 | Romes.......................... | 83/311 X |

*Primary Examiner*—Frank T. Yost
*Attorney*—Parker, Carter & Markey

ABSTRACT: A method of and an apparatus for controlling the movement of a cutting die to bring it to the velocity of moving material to cut the material into pieces of predetermined lengths. The position of the die is controlled from the start of its acceleration until the material is cut in accordance with the velocity of the moving material.

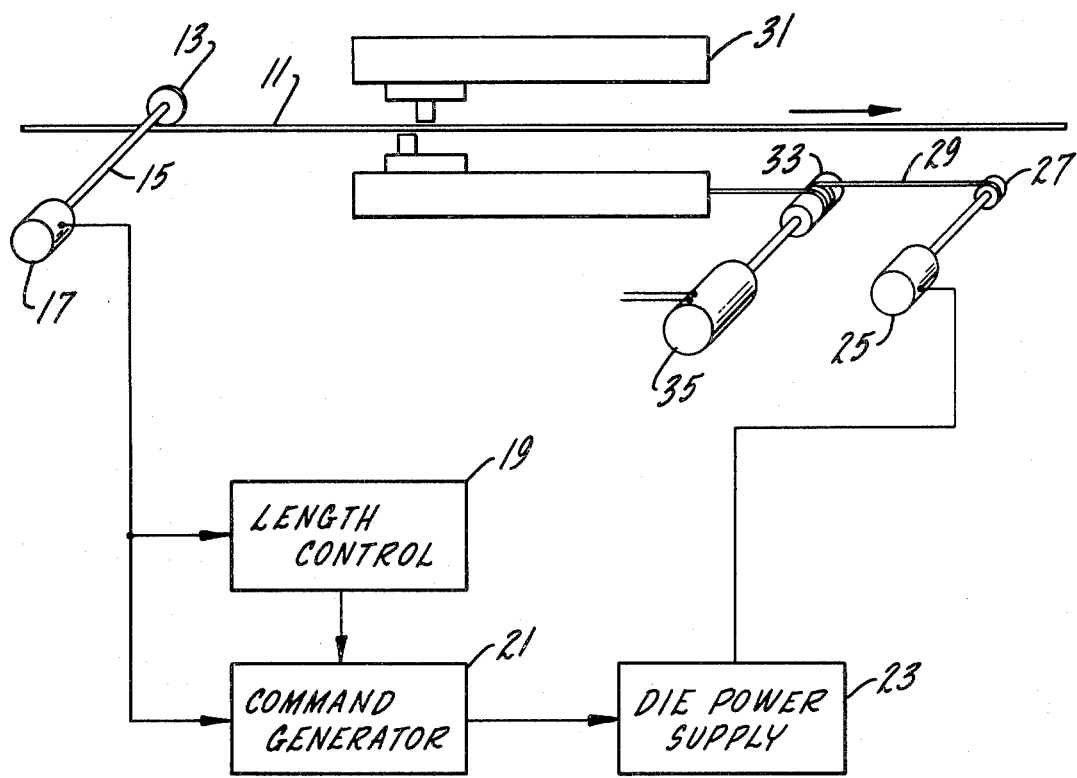

DIE ACCELERATOR

SUMMARY OF THE INVENTION

This invention is concerned with a method and an apparatus for accelerating a cutting die.

An object of this invention is to accelerate a die to the speed of moving material to accurately cut the material.

Another object is to coordinate the acceleration of a die in accordance with the velocity of the material to be cut by the die.

Another object is to control the velocity of a die from the beginning of its acceleration until a cut is completed.

Another object is a die-accelerating apparatus which provides accurate cuts of moving material in spite of changes in the velocity of the material being cut.

Another object is a mechanical amplifier which allows a small force to control movement of a large cutting die.

Other objects may be found in the following specification, claims and drawing.

BRIEF DESCRIPTION OF THE DRAWING

The invention is illustrated more or less diagrammatically in the drawing which shows the cutting die, the die accelerator apparatus and the mechanical amplifier.

DESCRIPTION OF THE PREFERRED EMBODIMENT

An apparatus for practicing the method of this invention is shown in the drawing. The material which is to be cut into lengths or pieces is shown as an elongated sheet of metal 11 which may be assumed to be moving from left to right as viewed in the drawing. Although the method of this invention will be described as applied to the cutting of sheet material such as sheet metal, it should be understood that the same method and apparatus may be used for cutting other elongated materials such as tubes, bars, wires, pipes, etc. which are commonly cut to length by dies which are brought to the speed of the moving material to make the cut. The material speed may be in the range of 300 feet per minute. With material moving at such high speeds, uniformity in acceleration of the cutting die is necessary to prevent serious variations in the lengths of the pieces of material being cut.

A wheel 13 rides on he moving material 11 and is connected by a shaft 15 to a pulse generator 17. The pulses from the generator 17, which indicate length and may be, for example, one pulse for each 0.01 inch, are directed to a length control device 19 and a command generator 21. The length control device is a counting circuit of conventional design. It is set for the desired length of the pieces of material to be cut, for example 60 inches, 180 inches, etc., and is adjustable. The command generator is a computational circuit of conventional design. It receives a train of input pulses from the pulse generator and provides a train of output pulse signals in accordance with a built-in formula.

The output from command generator is directed to a die power supply 23. The die power supply 23 is connected to a step motor 25. The die power supply amplifies the signals from the command generator sufficiently to power the step motor. Each signal pulse moves the motor through one increment of rotation. A step motor having 240 increments of rotation in each revolution has been found to operate satisfactorily. The step motor 25 drives a pulley 27 which is connected to one end of a belt 29. The opposite end of this belt is connected to a die 31. Intermediate its ends, the belt is wrapped around a pulley 33 driven by a motor 35. The pulley 33 may be surfaced with material of the type used in clutches to provide frictional engagement between the belt and the pulley. When the step motor 25 is actuated by the die power supply 23, it tensions the belt 29 bringing it into engagement with the pulley 33 being driven by the motor 35. As the belt 27 engages the pulley 33, the belt is moved due to frictional engagement with the pulley, thereby pulling the die 31. By means of this mechanical amplifier, the relatively small torque of the step motor 25 is magnified by the relatively large torque of the motor 35 to accelerate the die. Where the dies are small it may be possible to eliminate the mechanical amplifier and move the dies directly by the step motor 25.

It has been determined that the die 31 can be accelerated to the velocity of the moving material in a travel distance of one-half the distance traveled by the material 11 during the acceleration of the die. Also, the travel distance of the die from its starting position can be expressed by the formula $Xd = Xm^2/2B$ where $Xd$ is the die travel, $Xm$ is the instantaneous distance traveled by the material during the acceleration of the die and B is the total distance traveled by the material during the acceleration of the die. The command generator 21 receives the input $Xm$ from the pulse wheel 17 and the input B from the length control device 19 and produces an electrical pulse output $Xd$ which is equal to $Xm^2/2B$. Thus, the increments of travel of the material 11 from the starting of acceleration of the die are the input factors and the output factor is the desired increment of travel of the die for each increment of travel of the material. The position of the die is controlled during the entire acceleration of the die until it matches the velocity of the moving material. Thus, the travel distance of the die from the start of acceleration until the moving material is cut varies in accordance with the distance the material moves during this period of acceleration.

As an example, assume that the moving material 11 is to be cut into pieces 60 inches long. As the material moves past the wheel 13, a train of pulses from the pulse generator 17 is fed to the length control device 19 and the command generator 21 at the rate of one pulse for each 0.01 inch of material. The length control is set for 60 inches and therefore when 6,000 pulses have been received, the length control device will send a stop signal to the command generator. The command generator converts the continuing train of electrical impulses ($Xm$) being received from the pulse generator to an electrical pulse output ($Xd$) in accordance with the previously mentioned formula which is built in to the command generator. The output signals from the command generator are fed to the die power supply 23 where they are amplified. The amplified output from the die power supply is directed to the step motor 25 and moves this motor through an increment of rotation for each pulse signal supplied thereto. The rotation of the pulse motor moves the belt 29 which tightens the belt around the pulley 33 driven by motor 35. As the belt tightened, the frictional contact between the belt and the pulley 35 is increased, moving the belt to accelerate the die in accordance with the amplified output of the command generator 21. The output signals from the command generator continue until the stop signal is received from the length control device. The die is actuated to cut the moving material upon termination of the output signals from the command generator.

I claim:

1. A method of coordinating the movement of a die relative to material moving in a given path so that the die and a selective point on the material will arrive simultaneously at a cutoff position while moving at identical velocities including the steps of:

selecting a point on the moving material, measuring, at regular length increments, the position of said point relative to a starting position, developing signals from said measurements indicative of the position of said point, utilizing said signals indicative of the position of said point to compute, in accordance with a predetermined relationship between the instantaneous position of said point and the desired position of said die at the same instant, the desired position of the die, generating a signal representing the desired position of the die, and utilizing said signal representing the desired position of the die to continuously control the instantaneous position of the die during acceleration such that said die and said point reach said cutoff position simultaneously and while moving at the same velocity, and actuating said die to cut said material when said die and the selected point on said material reach said cutoff position.

2. The method of claim 1 further characterized in that the predetermined relationship between the position of said point and the desired position of the die during acceleration may be expressed by the formula $Xd=Xm^2/2B$ where $Xd$ is the amount of die travel from its starting point during acceleration, $Xm$ is distance traveled by the point on the material during acceleration of the die and $B$ is the total distance of travel of the point on the material during acceleration of the die.

3. An apparatus for coordinating the movement of the die relative to the material moving in a given path to bring the die from rest to the velocity of the material and to bring the die into coordination with a selected point on the material at a cutoff location including:

means to measure the travel distance of said material along said path of travel at predetermined length increments during the acceleration of said die, means to generate signals indicative of the amount of travel of said material at each of said predetermined time intervals, means to utilize said signals indicative of the amount of travel of said material to compute, in accordance with a predetermined relationship between the instantaneous position of said selected point and a desired position of said die at the same instant, the desired position of the die, means to generate a signal representing the desired position of the die based upon the computed desired position of the die, and means to utilize said signal representing the desired position of the die to continuously control acceleration of the die and the relationship between the position of the die and the position of the selected point on the material at each interval of time so that the die and selected point on said material reach a cutoff position simultaneously and while moving at the same velocity, and means to actuate said die to cut said material at said selected point when said cutoff position is reached.

4. The apparatus of claim 3 further characterized in that said means to utilize said die control signal to accelerate said die includes a step motor responsive to said signals.

5. The apparatus of claim 4 further characterized in that means are provided to mechanically amplify the output of said step motor to accelerate said die.

6. The apparatus of claim 5 further characterized in that said means to mechanically amplify the output of said step motor includes a:

a rotating drive means, an elongated band connected at one end to said die, at its other end to said step motor and being wrapped intermediate said ends about said drive means, said step motor being adapted to tension said band to engage said band with said drive means to thereby move said band and accelerate said die.

* * * * *